United States Patent [19]

Packer et al.

[11] Patent Number: 5,685,671

[45] Date of Patent: Nov. 11, 1997

[54] DIAMOND OR CBN FLUTED CENTER CUTTING END MILL

[75] Inventors: Scott M. Packer, Pleasant Grove, Utah; Arturo A. Rodriguez, West Bloomfield, Mich.; Ronald B. Crockett, Provo, Utah

[73] Assignee: Smith International, Inc., Houston, Tex.

[21] Appl. No.: 462,990

[22] Filed: Jun. 1, 1995

Related U.S. Application Data

[63] Continuation-in-part of Ser. No. 146,679, Nov. 1, 1993, abandoned.

[51] Int. Cl.⁶ ............................................. B23B 5/10
[52] U.S. Cl. .................... 407/54; 407/63; 407/118; 408/144
[58] Field of Search .................. 407/42, 54, 61–63, 407/118, 119; 408/144, 230

[56] References Cited

U.S. PATENT DOCUMENTS

| | | |
|---|---|---|
| 3,409,965 | 11/1968 | Fisher ................................. 407/63 |
| 4,527,643 | 7/1985 | Horton et al. . |
| 4,627,503 | 12/1986 | Horton . |
| 4,712,948 | 12/1987 | Kidani ................................. 407/54 |
| 4,762,445 | 8/1988 | Bunting et al. . |
| 4,991,467 | 2/1991 | Packer ............................... 76/108.6 |
| 5,031,484 | 7/1991 | Packer ............................... 76/108.6 |
| 5,070,748 | 12/1991 | Packer ............................... 76/108.6 |
| 5,226,760 | 7/1993 | Nishimura .......................... 407/54 |

*Primary Examiner*—M. Rachuba
*Assistant Examiner*—Kenneth J. Hansen
*Attorney, Agent, or Firm*—Christie, Parker & Hale, LLP

[57] ABSTRACT

A center cutting or plunging end mill or ball nose end mill has one or more spiral grooves and flutes in the walls of a mill body of cemented tungsten carbide. Each groove includes polycrystalline diamond or cubic boron nitride formed in situ along a leading edge of each flute. Such a groove extends across the cutting end of the mill so that the mill can be used for center cutting or plunging. The vein of diamond-like material may extend to the center of the mill body or may extend almost all of the way to the center, leaving an area of tungsten carbide exposed at the center of the mill body. A high temperature-high pressure press is used for forming the polycrystalline diamond-like veins in situ within the grooves in the mill.

14 Claims, 5 Drawing Sheets

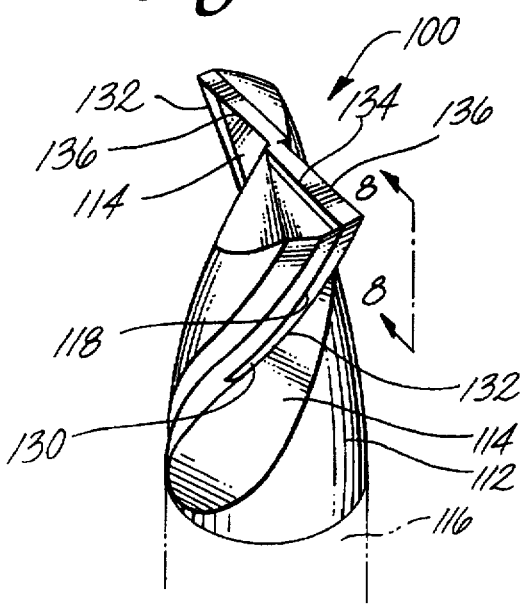
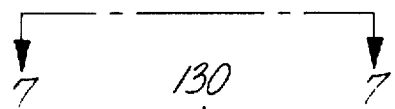
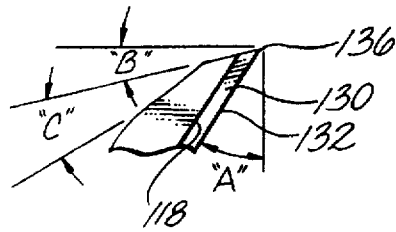
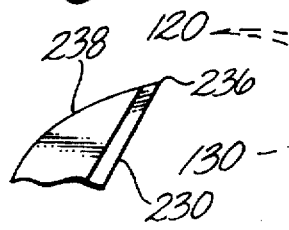
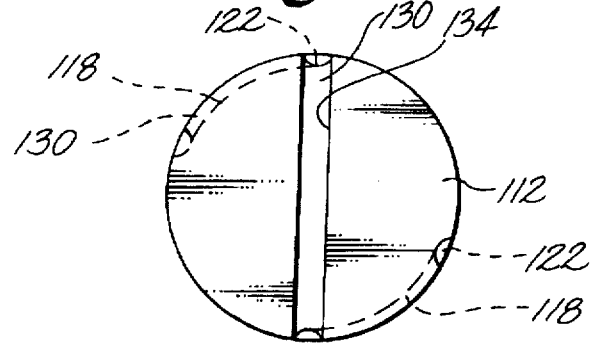

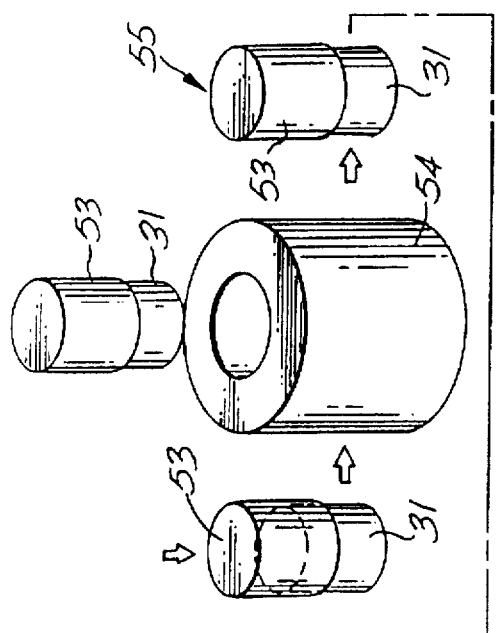
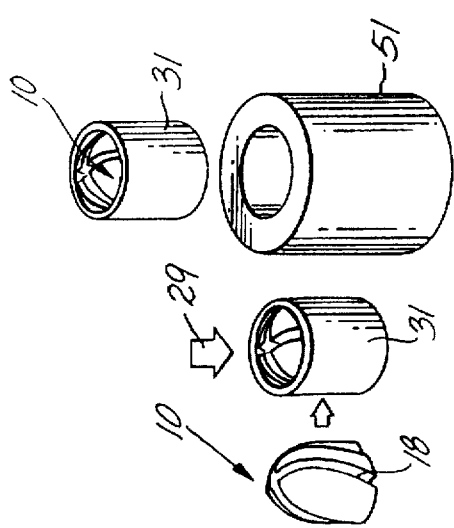
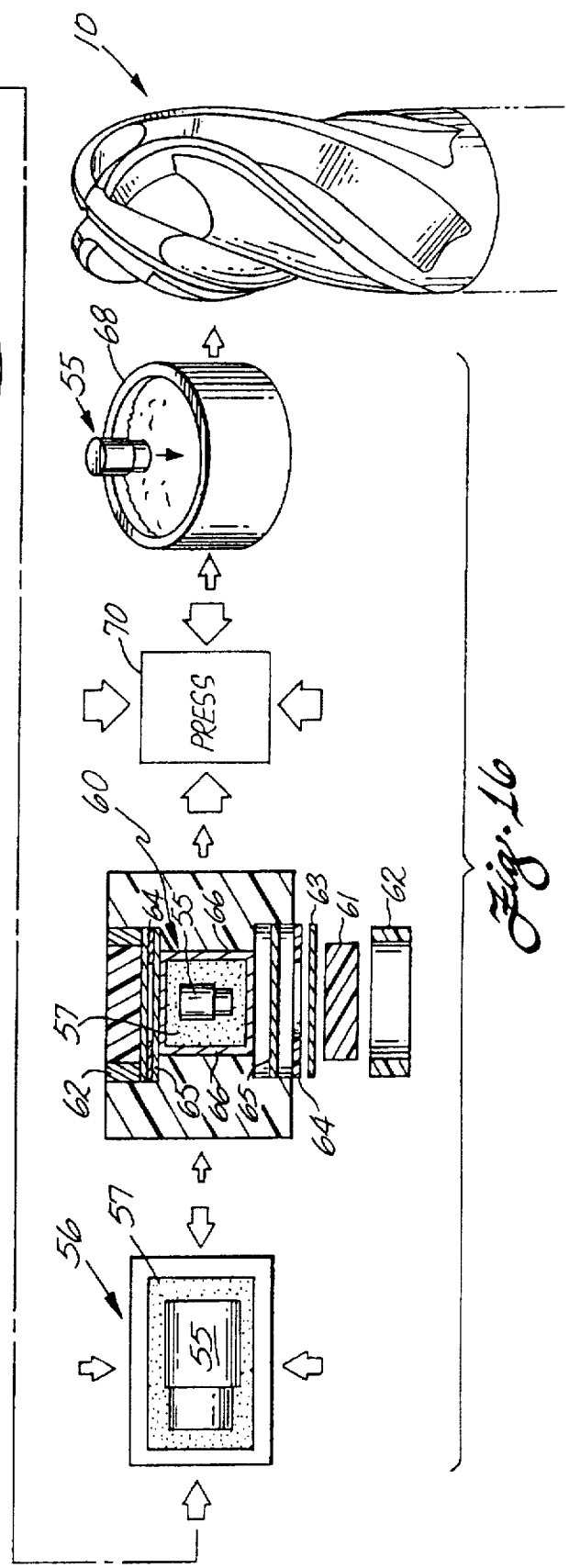
Fig. 16

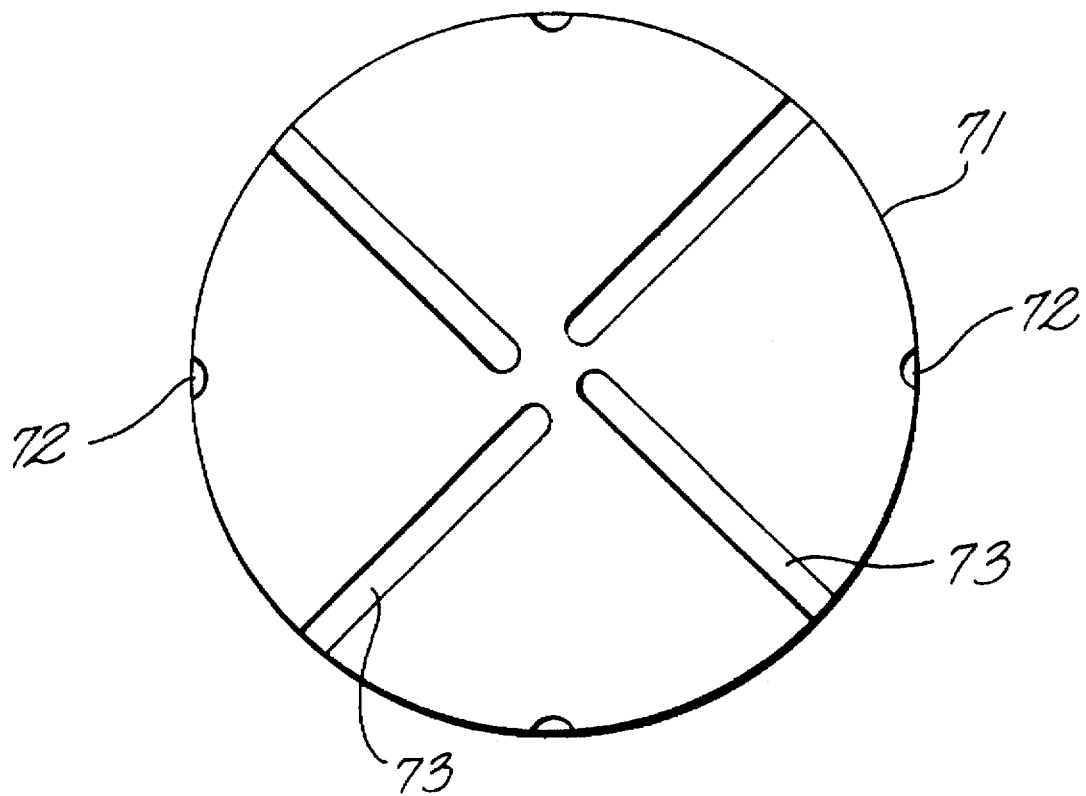

DIAMOND OR CBN FLUTED CENTER CUTTING END MILL

This application is a continuation in part of U.S. patent application Ser. No. 08/146,679, filed Nov. 1, 1993, now abandoned.

BACKGROUND

This invention relates to rotary cutting tools and more particularly to helically fluted end mills and ball nose end mills with diamond-like cutting edges.

Helically fluted end and ball nose end mills are commonly used milling tools and are generally required to perform severe machining operations under adverse conditions as well as finishing operations where a fine surface is desire. The cutting end of a helically fluted end mill, for example, includes at least one cutting edge on the end mill blank. The cutting end of a ball nose end mill carries the cutting edge around the hemispherical end of the mill.

Oppositely directed cutting surfaces positioned at the cutting end of the mill blank are subjected to axial and torsional loads which create demands on the materials used for fabrication of the milling tool. Clearly the material of the cutting edge should be as hard as possible to cut a workpiece and it should also be heat resistant to maintain the cutting edge of the mill at elevated temperatures. Moreover, the material of the body of the mill blank must be both rigid and tough to resist deflection and to maintain the integrity of the mill under loads while the end mill is being used. The foregoing requirements have resulted in compromises in material selection since hard materials tend to be brittle while tough materials tend to wear quite easily.

This invention has application for other types of rotary cutting tools such as router bits, reamers and taps which may have cutting surfaces on an end face.

The prior art teaches a combination of materials having the characteristics of hardness and wear-resistance at the cutting surfaces and toughness and rigidity of the body and shaft. It has been previously proposed to form the cutting surfaces of one material and the body and shaft of another. This has resulted in a variety of combinations such as cemented tungsten carbide or diamond inserts or tips on carbon steel or carbide shafts. These combinations while individually useful have a common disadvantage, i.e. the braze connection between the insert or tip and a shaft.

Tungsten carbide can be soldered or brazed directly to the steel or shaft. However, diamond must first be adhered to a carbide substrate which is in turn soldered or brazed to the shaft. Diamond particles are typically formed into a compact or PCD (polycrystalline diamond) disk and bonded to a carbide substrate with a metallic catalyst in a high pressure-high temperature press. At atmospheric pressures, however, the metal which catalyzes the bonding of the diamond particles to each other and to the substrate in the press will also catalyze the conversion of diamond to graphite at temperatures above 700° C. which will cause disintegration of the PCD compact. Accordingly a low temperature solder or braze connection is used to attach the substrate to the shaft. The aforementioned diamond disks as well as the diamond insert stud blanks, for example, are fabricated from a tungsten carbide substrate with a diamond layer sintered to a face of a substrate, the diamond layer being composed of polycrystalline material.

A suitable synthetic polycrystalline diamond layer is manufactured by Megadiamond Industries, Inc., Provo, Utah.

Two examples of patents assigned to Megadiamond describe cutting elements for drilling holes. U.S. Pat. No. 4,527,643 describes a cutting element for drilling holes which consists of five cutting edges which are comprised of polycrystalline diamond or the like mounted to a central carbide substrate of similar hard material held by a rotatable shaft which can be inserted into a drilling machine. The polycrystalline material is then supported with respect to torsional forces exerted upon it during drilling.

U.S. Pat. No. 4,627,503 describes a polycrystalline diamond and metal element for use as a cutting element for drilling holes or similar uses. The cutting element comprises a polycrystalline diamond center portion sandwiched between metal. The metal side portion is made from a soft metal having a Young's Modulus less than approximately $45 \times 10^6$ and is selected from a group comprising cobalt, nickel, iron, copper, silver, gold, platinum, palladium and alloys of these metals.

Both of these patents utilize a braze type bonding element to secure the diamond cutters within a drill blank. Typically a low temperature solder or braze connection is used to attach the substrate to a shaft such as the shaft of a helical twist drill. This braze connection limits the effective life of such drilling tools since it is softer than either the substrate or the shaft. Thus, the braze becomes the weakest point of the tool construction and the limiting factor in the tool usage.

U.S. Pat. No. 4,762,445 teaches a helically fluted twist drill apparatus in which offset opposed veins of sintered abrasive particulate, such as diamond, are embedded within a drill blank made of a less abrasive material such as carbide. The non-aligned veins of abrasive material, themselves intersect adjacent the point and web of the drill. The veins of diamond are 180° opposed across the tip of the helical drill blank. The opposing veins intersect at the center or axis of the helical drill to provide a concentration of diamond at the tip of the twist drill.

U.S. Pat. No. 4,991,467 describes a diamond tipped twist drill for drilling holes in a workpiece. A drill blank body has a pair of flutes, each flute including a channel that essentially parallels the flutes. Each channel ends at an aperture formed in the body nearest a cutting end of the drill. Diamond material is pressed into the grooves and through the aperture. Subsequent machining at the cutting end of the drill bit body exposes the diamond at the cutting tip and the diamond adjacent the leading edge of the flutes.

U.S. Pat. Nos. 5,031,484 and 5,070,748 describe an end mill having at least a pair of spiral grooves or flutes in the mill blank side walls. Each groove includes polycrystalline diamond or polycrystalline cubic boron nitride formed along a leading edge of each flute. The end mills described by the foregoing patents do not have center cutting capabilities.

U.S. Pat. Nos. 4,991,467; 5,031,494 and 5,070,748 are hereby incorporated by reference.

The present invention overcomes the problems of the foregoing prior art by providing, for example, a concentration of diamond on a flute and across the end face of a milling cutter blank.

BRIEF SUMMARY OF THE INVENTION

A center cutting end mill comprises a cutting end and a base end. Flutes extend from the cutting end toward the base end. The end mill has a groove across the cutting end and a groove adjacent to a leading edge of each flute. Each groove is filled with polycrystalline diamond-like material sintered in situ within the groove. The diamond-like material is exposed to form a cutting edge along the leading edge of the diamond-like material extending sufficiently close to the center of the end mill for cutting a workpiece all the way to the center of the end mill.

The groove in the cutting end may extend to the center axis of the end mill or may stop short of the center axis of the end mill, leaving a portion of the end mill body exposed at the center of the cutting end. The groove extending from the cutting end toward the base end may be a single groove extending from at least adjacent to the center of the cutting end toward the base end or them may be separate grooves. In an end mill with a sharp intersection between a generally flat cutting end and a generally cylindrical side wall, the grooves may be offset from each other for forming separate cutting edges at the intersection.

BRIEF DESCRIPTION OF THE DRAWINGS

The above noted objects and advantages of the present invention will be more fully understood upon a study of the following description in conjunction with the detailed drawings wherein:

FIG. 5 is a perspective view of a plunging end mill with diamond or CBN formed in a leading edge of the flutes and diamond formed in a groove formed across the cutting end of the end mill body;

FIG. 6 is a side view of a plunging carbide end mill blank with a pair of helical grooves formed in the flanks of the blank with an additional groove formed across the cutting end of the blank;

FIG. 7 is an end view taken at 7—7 of FIG. 6;

FIG. 8 is a partial side view taken at 8—8 of FIG. 5 illustrating the diamond or PcBN curing rake angle and primary and secondary cutting edge relief angles formed behind the diamond or PcBN cutting edge;

FIG. 9 is an alternative configuration of the polycrystalline diamond or PcBN cutting edge with a parabolic cutting edge relief angle;

FIG. 16 is a semi-schematic diagram of the process steps involved to fabricate both the end mill and the ball nose end mill cutters; and FIG. 17 illustrates in end view a representative end mill having multiple cutting edges.

DESCRIPTION

Figure 1:
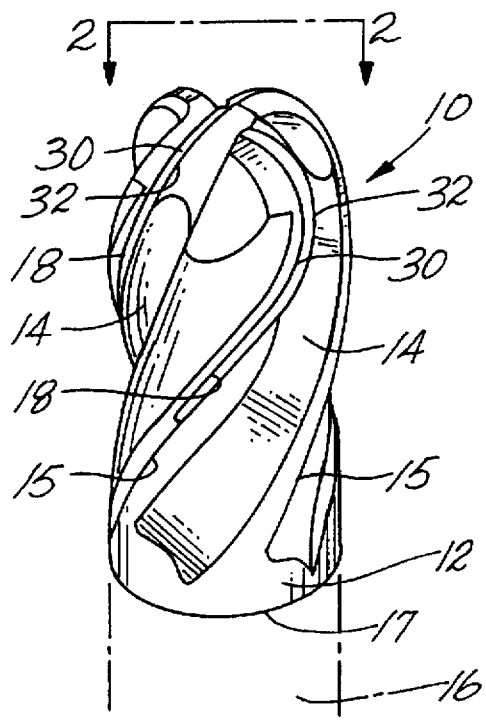
FIG. 1 is a perspective view of a fluted ball nose end mill.

The polycrystalline diamond (CBN) or polycrystalline cubic boron nitride (PcBN) ball nose end mill of FIG. 1 generally designated as 10 comprises an end mill body 12 having, for example, four helical flutes 14 circumferentially and equidistantly spaced around the body. The body of the ball nose end mill may, for example, be fabricated from a hard and tough material such as cemented tungsten carbide. The term "diamond" is used herein interchangeably to denote polycrystalline diamond, polycrystalline cubic boron nitride, or both. A groove 18 is formed in the leading edge 15 adjacent the flutes 14. A sintered polycrystalline diamond or PcBN 30 is formed in situ in the helically formed groove 18. Cutting edges 32 are, for example, ground into the sintered diamond material 30 in the grooves 18 in the end mill body 12. The tungsten carbide end mill body may then be metallurgically bonded to a steel or carbide shank 16 along a juncture 17. The metallurgical bond may, for example, be a braze.

Figure 2:
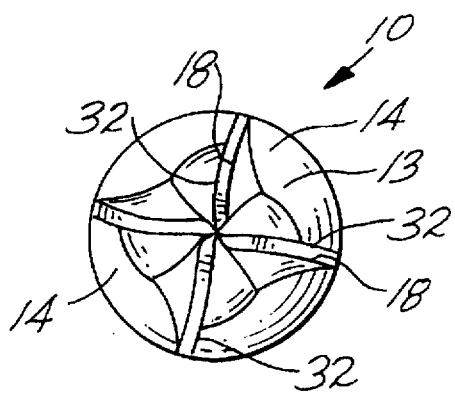
FIG. 2 is an end view taken at 2—2 of FIG. 1.

Turning now to FIG. 2, the end 13 of the ball nose end mill 10 further illustrates the grooves 18 adjacent the leading edge of the flutes 14. The polycrystalline diamond or polycrystalline cubic boron nitride 30 is compacted and sintered within the grooves 18. The flutes 14 and the cutting edge 32 are, for example, ground into the PCD or PcBN material after the sintering process is complete (the schematically depicted process of FIG. 16). The PCD or PcBN cutting edge can be formed by methods which include grinding, wire electrical discharge cutting (wire EDM), and electrical discharge grinding (EDG).

Figure 4:
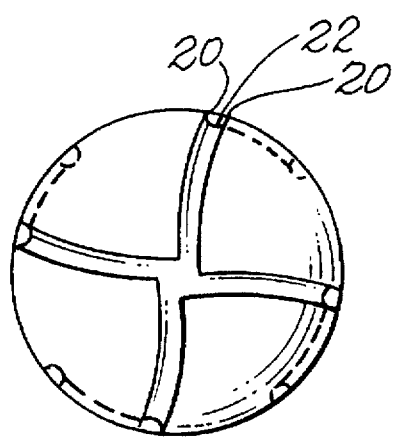
FIG. 4 is an end view taken at 4—4 of FIG. 3.
Figure 3:
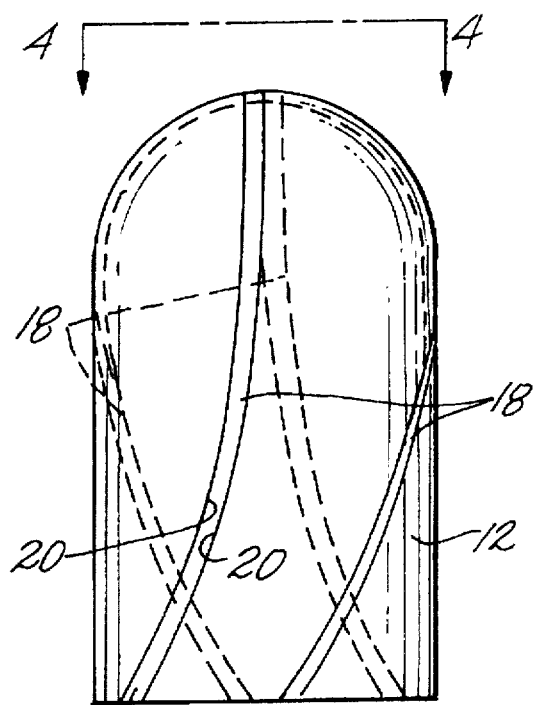
FIG. 3 is a side view of a ball nose end mill blank with four helical grooves formed in the flanks and hemispherical end of the blank.

Turning now to FIG. 3, the tungsten carbide end mill body 12 is formed with, for example, four helically configured grooves 18 therein. The flutes 14 are formed in the mill body after the diamond or cbn is sintered within the grooves 18. The helically formed grooves 18 are, for example, equidistantly spaced around the outer circumferential walls of the body 12 and provide a receptacle for the diamond or cbn powder compacted therein. The sides 20 of the helical groove 18 preferably transition into a rounded bottom 22 of the groove 18 (FIG. 4). Identical sides 20 are formed in the other grooves 18. The reason for the rounded bottom of the groove is to assure that the polycrystalline diamond or PcBN powder material is packed into the groove without any possibility of voids. If the sides of the groove were not curved to the bottom 22 of the groove, then the sharp 90° corners could cause stress risers and voids in the diamond or PcBN material.

With reference now to FIG. 4, the end view of the ball nose end mill illustrates the merging of the four helically formed diamond veins 18 at the apex of the ball nose end mill body 12. This merging of the veins of diamond-like material in the center of the mill enable it to be a plunging mill or center cutting mill. Such a mill may be driven axially (while rotating) directly into a surface to be milled. The center cutting permits the mill to form its own hole as it descends. Such a center cutting or plunging end mill may be a cylindrical mill with flutes in the side walls or a spherical ball nose end mill. Other shapes are also usable as pointed out hereinafter.

As used herein, end mill refers to a mill that can be plunged axially into a workpiece to form its own hole. It may be cylindrical with a flat end face for forming what amounts to a flat bottom hole or if the end of the mill is hemispherical it is referred to as a ball nose end mill. Such mills are not necessarily used only for plunging cuts and are often used as a router or for shaping a profile on a workpiece.

One may also provide diamond or cbn ball nose end mills and end mills with one or more grooves that substantially parallel an axis of the mill body instead of extending helically. Referring now to FIGS. 1 and 2, the grooves 18 are compacted with diamond or cbn powder 30 and sintered in a high temperature-high pressure press. Thus, the polycrystalline diamond or PcBN material 30 is formed in situ in the helical grooves 18 of the tungsten carbide body 12. The polycrystalline diamond may be fabricated according to the process in U.S. Pat. No. 4,797,241 which is incorporated herein by reference. The end mill body is then ground or machined to form the flutes 14. A subsequent grinding process forms the cutting surfaces 32 on the sides and end of the body.

Referring now to FIG. 5, the plunging end mill generally designated as 100 comprises an end mill body 112 having, for example, a pair of flutes 114 on opposite sides of the body 112. A groove 118 is formed in the leading edge 115 of the flutes 114. Diamond or cbn powder 130 is sintered in the groove 118 and cutting edges 132 are subsequently ground into the sintered diamond. A groove 134 is further formed across the cutting end of the end mill that has diamond or cbn 130 sintered therein. Cutting edges 136 are ground in the sintered diamond enabling the end mill to be axially plunged into a workpiece (not shown).

FIG. 6 depicts a tungsten carbide mill body 112 formed with, for example, two helically configured grooves 118 therein. The helically formed grooves are equidistantly spaced around the outer circumferential walls of the body 112 and provide a receptacle for the diamond or cbn powder 130 subsequently compacted therein. The sides 120 of each groove 118 transition into a rounded bottom 122 to assure that the grooves are completely filled with diamond or cbn 130 as was previously described with respect to FIGS. 1 through 4. End groove 134 intersects each of the grooves 118 and similarly is filled with diamond powder 130.

FIG. 7 is an end view of the mill shown in FIG. 6 illustrating the groove 134 communicating with helical slots 118.

FIG. 8 depicts diamond or cbn cutting edges 132 and 136, the fluted cutter having, for example, a positive top rake angle "A" of about 0° to 25°, preferably 10° to 15°. In addition, the primary relief area "B" and secondary relief area "C" are angled to provide clearance behind the cutting edges 132 and 136.

FIG. 9 is an alternative embodiment wherein the relief area 238 is parabolic behind diamond cutting edges 230 and 236.

Figure 10:
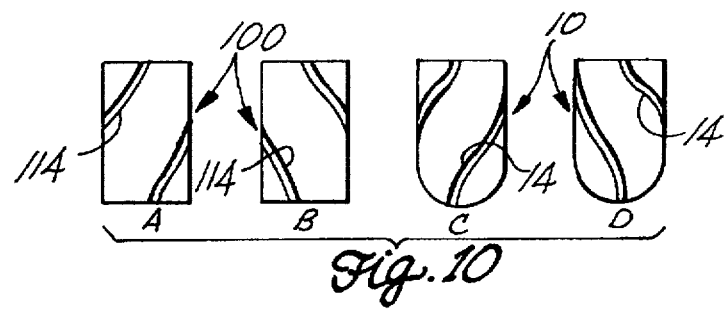
FIG. 10A is a side view of an example of an end mill blank with right hand flutes.
FIG. 10B is a side view of an example of an end mill blank with left hand flutes.
FIG. 10C is a side view of an example of a ball nose end mill blank with right hand flutes.
FIG. 10D is a side view of an example of a ball nose end mill blank with left hand flutes.

FIGS. 10A and 10B illustrate end mills 100 with right and left hand flutes 114, respectively. FIGS. 10C and 10D depict ball nose end mills 10 with left and right hand flutes 14, respectively.

Figure 11:
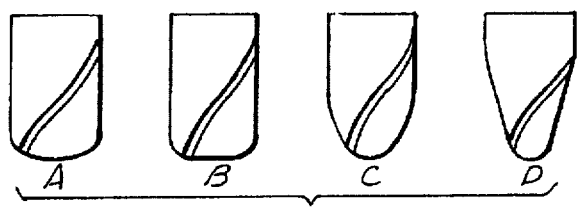
FIG. 11A is a side view of an example of an end mill blank with a variable radius cutting end with right hand flutes.
FIG. 11B is a side view of an example of a flat ended end mill blank with rounded corners at the cutting end.
FIG. 11C is a side view of an example of an end mill blank with a cutting end having an elliptical cutting end.
FIG. 11D is a side view of an example of a tapered ball nose end mill blank with a tapered cutting end.

FIG. 11A shows an end mill with a variable radius cutting end with right hand flutes. FIG. 11B shows a flat ended end mill with rounded corners and right hand flutes. FIG. 11C is an end mill with an elliptical cutting end with right hand flutes and FIG. 11D illustrates a tapered ball nose end mill with a tapered cutting end and right hand flutes. These can also have left hand flutes. Both right and left hand helical flutes can also be either up-shear or down-shear. Both can have a variable and/or multiple taper angle geometry in up-shear or down-shear.

Figure 12:
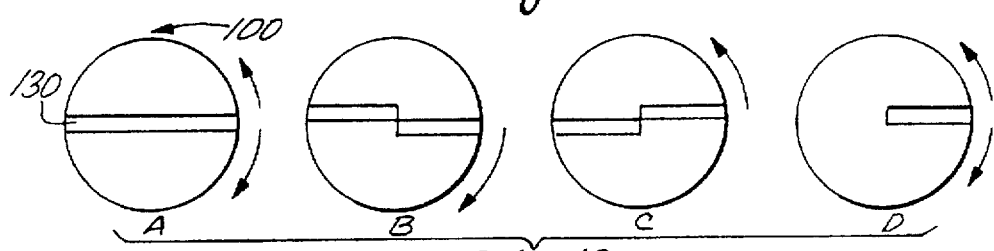
FIG. 12A is a top view of a plunging end mill with a diamond or CBN filled groove across the cutting end that passes through the axis of the end mill such that it enables the end mill to be rotated in either direction.
FIG. 12B is a top view of an end mill with diamond or CBN across the cutting end of the mill, half of the diamond or CBN is ahead of center for the direction of the cutter rotation.
FIG. 12C is a top view of an end mill with the diamond across the cutting end the reverse of FIG. 12B, so that the plunging end mill is rotatable in a counter clock-wise direction.
FIG. 12D is a top view of an end mill with diamond or CBN aligned on the axis of the end mill, the diamond covering up to half of the cutting end, the mill being rotatable in either direction.

FIG. 12A is a view of the cutting end of the plunging end mill 100 with the diamond or cbn material 130 passing through the central axis of the end mill such that the mill may be rotated in either direction as a right or left hand end mill. FIG. 12B aligns the diamond 130 to the right of the axis, ahead of the axis for a left hand or right hand helix such that the end mill may only be rotated clockwise. FIG. 12C is the reverse of 12B, hence rotation is counter-clockwise. FIG. 12D depicts an end mill with a vein of diamond extending generally radially on half the cutting end of the end mill aligned with the axis so that the mill may be rotated in either direction.

Figure 13:
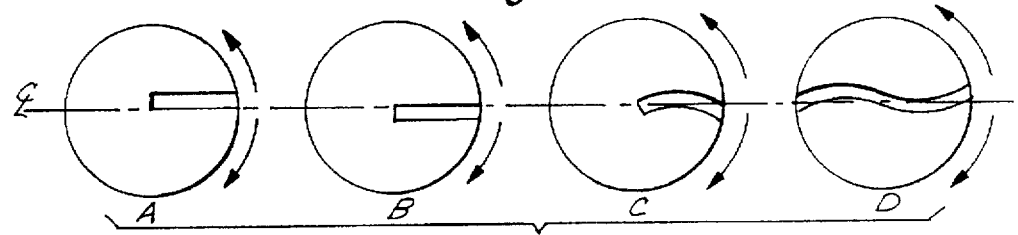
FIG. 13A is a top view of an end mill with diamond or CBN aligned above the axis, the diamond covering up to half the of the cutting end, the end mill being rotatable either clockwise or counter clockwise.
FIG. 13B is a top view of an end mill with diamond or CBN aligned below the axis, the diamond covering half the cutting end, the end mill being rotatable either clockwise or counter clockwise.
FIG. 13C is a top view of a ball nose end mill with one helical diamond or CBN flute ending at an apex of the mill, the ball nose end mill being rotatable in either direction.
FIG. 13D is a top view of a ball nose end mill with a pair of helical diamond flutes connecting at the apex of the ball nose end mill, the mill being rotatable in either direction.

FIG. 13A is the same as 12D accept that the diamond is positioned behind the axis as the end mill rotates counter clockwise and FIG. 13B is the reverse of 13A with a clockwise rotation. End mills shown in FIGS. 13A and 13B can be rotated in either direction.

Figure 14:
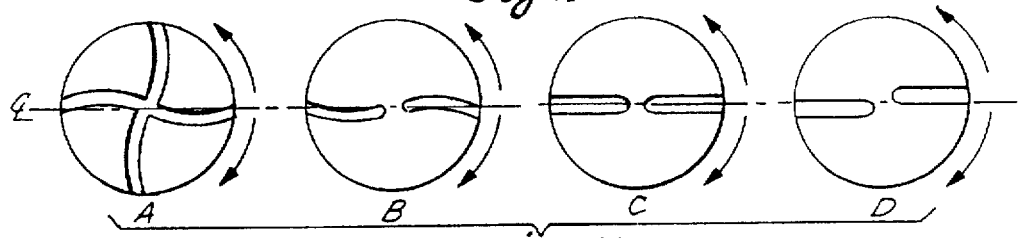
FIG. 14A is a top view of a ball nose end mill with four diamond flutes, each flute intersecting at the apex of the ball nose end mill, the mill being rotatable in either direction.
FIG. 14B is a top view of a ball nose end mill with a pair of helical flutes that terminate just short of the apex of the ball nose end mill, the mill being rotatable in either direction.
FIG. 14C is a top view of an end mill with a pair of diamond flutes that are aligned with the axis of the cutting end of the end mill, each flute ending just short of the axis, the mill being rotatable in either direction.
FIG. 14D is a top view of an end mill with a pair of diamond or CBN flutes separated from the axis, each flute being ahead of center such that the mill is rotatable in a clockwise or counter clockwise direction.

FIG. 13C is an end view of a ball nose end mill with at least a single helical flute terminating at the apex of the hemispherical. FIG. 13D is a ball nose end mill with a pair of helical flutes. FIG. 14A is a ball nose end mill with four helical flutes, all of which pass through the apex of the hemispherical end, and FIG. 14B is a ball nose end mill with a pair of helical flutes, the ends of which terminate just short of the apex of the ball.

Figure 15:
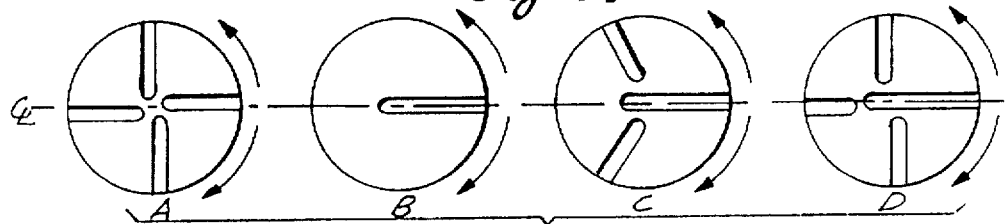
FIG. 15A is a top view of an end mill with four diamond or CBN flutes separated from the axis, each flute being ahead of center such that the mill is rotatable in a clockwise or counter clockwise direction.
FIG. 15B is a top view of an end mill with a single diamond or CBN flute that is aligned with and passes over the axis of the cutting end of the mill, the mill being rotatable in either direction.
FIG. 15C is a top view of an end mill with three diamond or CBN flutes disposed radially 120° across the cutting end of the mill, one of the axially aligned flutes passes over the axis, the other pair of flutes terminate just short of the axis, the mill being rotatable in either direction.
FIG. 15D is a top view of an end mill with four diamond or CBN flutes across the cutting end of the mill, one of the axially aligned flutes passes over the axis, the other three flutes terminate just short of the axis, the mill being rotatable in either direction.

FIG. 14C is a center cutting end mill rotatable in either direction with a pair of diamond flutes, the ends of which end short of the axis of the mill. FIG. 14D is the same as 14C except the PCD or PcBN is either ahead of center or behind center according to the direction of rotation. FIG. 15A is the same as 14D except there are four flutes. FIGS. 15B through 15D depict center cutting end mills with at least one of the radially disposed diamond flutes ending just past the axis of the end mill, the other of the flutes ending just short of the axis of the end mill.

The concentric arrows around FIGS. 12 through 15 indicate the direction of rotation of the end mills. FIGS. 12 through 15 are typical center geometries for the end mills illustrated in FIGS. 10 and 11.

Thus, the groove across the cutting end of the plunging mill may be a single groove extending all the way across a hemispherical end on a ball nose end mill or fluted mill, or may be segmented in a variety of ways as indicated in the embodiments illustrated in the drawings.

One may manufacture ball and end mills with from one to ten or more flutes and the flutes may be straight or a spiral helix angled up to 60° without departing from the scope of this invention. The cutting edge may have either negative or positive rake, from −10° to +20°, for example, without departing from the scope of this invention. One or more flutes or cutting edges of a multiple flute end mill may have diamond-like material.

What follows is a process of forming, for example, a 5/8 inch (16 mm) ball nose end mill cutter. Referring now to FIG. 16, a carbide body having, for example, four flutes, is formed slightly oversize (by 3/4 to 2 mm) on all dimensions of the ball nose end mill body. The ball nose end mill is ground to the proper diameter after the diamond sintering process is completed. As indicated before, the ball nose end mill body 12 is preferably formed from a cemented tungsten carbide material.

A helically formed groove 18 is formed where each vein of PCD or PcBN is desired with a depth of about 1.25 mm and a width of the groove 18 of about 1.25 mm. The sidewalls 20 of the groove transition into a rounded bottom 22 of the helical groove 18 and a wider opening at the surface of the body. As indicated before, the groove 18 is so configured to assure that the diamond powder is packed in the groove without voids. The diamond-like material is preferably diamond powder having a size range from 3 to 60 microns. The preferred size range of the powder is from 1 to 50 microns. The binder/catalyst for the diamond powder is cobalt. A ratio of cobalt to diamond is 5 to 20 percent by volume of cobalt. The percentage of cobalt is preferred to be 10 volume percent. The process is similar when forming a PcBN mill except that cubic boron nitride particles are packed in the grooves.

The grooves of the cemented tungsten carbide blank or body 12 are preferably prepared by "breaking" or "dulling" the edges of the grooves. The reason for dulling the edges of the grooves will become apparent with further discussion of the process. The mixed diamond powder and cobalt is then packed into the grooves 18. The blank 12 is then placed in a refractory metal can or receptacle 31. A typical refractory material is selected from the group consisting of zirconium, columbium, tantalum and hafnium. For example, the receptacle 31 is formed of columbium and placed over the diamond powder pressed in the grooves 18 formed in the blank.

The carbide blank 12 in the can is then run through a die to fit tightly around the blank. A second can 53 of columbium around the first can is run through a die to completely seal the second can 53 over the first can. The sealed can containing the blank 12 and now generally designated as 55 is then run through a pre-compact stage 56.

The can 55 is first surrounded by salt 57, then is put in a pre-compact press 56 to further compact the subassembly. The can is subjected to about 7000 kg/cm$^2$ in the pre-compact press. This assures that the blank 12 trapped within the columbium cans 50 and 53 is as tightly packed as possible prior to the sintering process. The compressed can 55 is now ready for the sintering process. The reason the groove edges are dulled is to prevent the columbium cans from being cut during the pre-compaction stage.

The can 55 is loaded into a pyrophyllite cube. The cube, generally designated as 60, is packed with salt rings 57 and lined with a graphite sleeve 66. The cube 60 is then capped with a titanium disk 65, followed by a mica ring baffle 64 and another titanium disk 63. A relatively thick steel ring 62 surrounds a pyrophyllite cap 61. Both ends of the pyrophyllite cube have the same assembly, thus closing in the can 55 within the salt rings 57 in the center of the pyrophyllite cube.

The assembled cube 60 then goes to a high pressure-high temperature press 70. The cube is pressed at a temperature of about 1,300° to 1,600° C. at a pressure of about 70,000 kg/cm$_2$. The total time of the press is approximately 10 minutes. In a specific example, the temperature is ramped up to 1,500° C. for about four minutes, the cube 60 is held at temperature of 1,500° C. for about one minute and is then allowed to cool down for approximately five minutes. Thus, polycrystalline diamond is formed in situ in the grooves in the blank. An important aspect of this process is that the heat up be relatively slow with a slow cool down period. This is done primarily to reduce residual stresses within the finished ball nose end mill.

The sintered can 55 is subsequently broken out of the pyrophyllite cube 60. The sintered ball nose end mill body 12 is still housed within the cans 31 and 53 of columbium. The enclosed ball nose end mill body 12 is immersed in a bath of fused potassium hydroxide to remove the columbium cans.

The body is then brazed to a mill shank 16. The body 12 with attached shank is ground to the finished diameter prior to grinding the flutes 14, sintered diamond 30 and relief angles as required. A larger press apparatus could be used to allow a continuous shank to be pressed with formed grooves to eliminate the need for a braze or solder joint. When the polycrystalline diamond is formed in the grooves, there is shrinkage from the diamond powder packed into the grooves. Typically, up to about two millimeters may be ground off the tungsten carbide body to bring its diameter down to the level of the polycrystalline diamond. After finishing, the PCD veins are in the order of about 1.5 to 2.5 mm wide and one to two millimeters deep.

The specific configuration of diamond filled grooves on the end face of an end mill or the like, depends on the purpose for which the mill is to be used. For example, different numbers of flutes and cutting edges may be desirable, depending on whether the mill is to be used for rough machining or obtaining a fine finish. The material for which the mill is to be used also affects the geometry of cutting edges.

In the event the end mill is to be used for a plunging cut into aluminum, a suitable configuration of grooves as illustrated in FIGS. 12A, 12B or 12C may be preferred. In each of these, the PCD material extends to the center of the end face.

On the other hand, if a tool is to be used for a plunging cut into relatively hard steel, or the like, a configuration as illustrated in FIG. 14C, 14D or 15A may be preferred. Typically, for steel a PcBN material may be used in the grooves and the PcBN material is formed do not extend quite to the center line of the end face or axis of the mill. At the exact center of the mill, there is essentially a zero surface speed during cutting. PCD or PcBN at that location may be inadequately supported by cemented tungsten carbide and be subject to breakage. A material tougher than PCD or PcBN is preferred. Thus, the grooves stop short of the center of the face, leaving a center point of cemented tungsten carbide which is appreciably tougher. The ends of the grooves may be only ¼ mm apart and a small "core" of workpiece between the diamond cutting edges is small and readily bends or breaks over into the areas cut by the diamond-like material.

Another groove geometry variable is whether grooves are aligned on a diameter of the end face as illustrated in FIGS. 12A and 12C, or whether the grooves are offset as illustrated in FIGS. 12B, 12C and 14D, for example. More commonly, the cutting edge on a mill is not on a diameter but is offset from the diameter. If the grooves are made and diamond formed in alignment on a diameter, additional diamond must be ground to form the cutting edges which are preferably offset from a diameter. Thus, in such an embodiment an offset configuration of the diamond filled grooves is preferred. Offset of the cutting edge from a diameter decreases the forces imposed during cutting and permits higher speed operation.

It has been found that in an end mill with a flat end face the mill tends to wear out first at the "corner" between the side faces of the mill and the end face, i.e., at the intersection between the cylindrical side of the body and the flat end face. An end mill as illustrated in FIG. 17 is desirable for such a situation. In this embodiment, the generally cylindrical cemented tungsten carbide body 71 has four grooves with veins of PCD or PcBN 72 formed in situ in the side walls. The end view of FIG. 17 illustrates a blank for forming an end mill before the flutes and cutting edges are ground. The ends of the filled grooves 72 can be seen and it will be understood that the grooves extend helically on the sides of the tungsten carbide body.

In addition, there are four grooves 73 across the end face of the end mill blank which are also filled with PCD or PcBN. These grooves are each offset from a diameter and end a short distance from the center of the end face. The grooves on the end face are offset circumferentially 45° from the grooves on the side of the end mill blank. When the flutes and cutting edges are ground into the body, there are four cutting edges formed at the "corner" by the four grooves 72 in the side wall and an additional four cutting edges where the end face grooves 73 reach the corner. Thus there are four cutting edges on the side and end faces and eight cutting edges at the critical corner where the most wear occurs. By doubling the number of cutting edges in the corner, the tools should last longer.

Other arrangements where the cutting edges on the end face are circumferentially offset from the cutting edges on the side for enhancing wear resistance at the corner of an end mill will be apparent. For example, such an arrangement may be employed with three cutting edges on each of the side and end faces to yield six cutting edges at the intersection between the side and end faces. Preferably the same number of cutting edges are employed on both, but the numbers could be different. If they are different, it is preferred that they be arranged so that there is symmetry and the mill is balanced.

Obtaining symmetry does not require that the veins of diamond in the end face be midway between the veins of diamond in the side walls of the mill. One could for example, arrange one set of veins to trail the other set 15° or so. All that is needed is sufficient distance between the leading and trailing grooves to allow for grinding flutes to provide rake clearance for the trailing set of cutting edges.

What is claimed is:

1. A center cutting end mill comprising:
   a first cutting end and a second base end and a body having a cylindrical side wall therebetween and a longitudinal central axis;
   a groove across the first cutting end;
   flutes on the side wall penetrating the body and extending from the cutting end toward the base end;
   a groove adjacent to a leading edge of each flute extending sufficiently close to the center of the end mill for cutting adjacent to the center of the end mill, wherein at the intersection of the cutting end and the side walls, an end of the groove in the cutting end is not aligned with any end of any groove in the side wall; and
   polycrystalline diamond material sintered in situ within each groove, the diamond material being exposed to form a cutting edge along the leading edge of the diamond material.

2. A center cutting end mill according to claim 1 wherein the groove in the cutting end extends to the center axis of the end mill.

3. A center cutting end mill according to claim 1 comprising a plurality of grooves in the cutting end wherein the grooves do not extend to the central axis of the end mill.

4. A center cutting end mill according to claim 3 wherein the grooves in the cutting end of the mill body extend generally radially and are offset from a diameter of the cutting end.

5. A center cutting end mill according to claim 1 wherein the mill is a center cutting ball nose end mill having a generally hemispherical cutting end wherein the groove across the first cutting end of the mill body extends across substantially the entire hemispherical cutting end.

6. A center cutting end mill according to claim 1 comprising a plurality of grooves in the end face and a plurality of grooves in the side wall, wherein, at the intersection of the of the end face and side wall, the ends of the grooves in the side wall are out of alignment from the ends of the grooves in the end face forming separate cutting edges at the intersection.

7. A fluted center cutting end mill comprising:

a cemented tungsten carbide mill body having a first cutting end, a second base end, a generally cylindrical side wall and at least two side grooves in the cylindrical side wall, the mill body further having at least one end groove across a portion of the first cutting end of the mill body;

a vein of polycrystalline diamond material formed in-situ within the groove in the cutting end of the mill body;

at least one flute exposing a leading edge of the vein of diamond material in the cutting end of the mill body for forming a continuous cutting edge along the leading edge of the diamond material;

a vein of polycrystalline diamond material formed in-situ within each side groove in the side wall; and flutes in the side wall exposing a leading edge of each of the veins of diamond material in the side wall, forming a continuous cutting edge along the leading edge of the diamond material, wherein an end of a vein in the cutting end is not aligned with any vein in the side wall at the intersection of the cutting end and side wall, forming separate cutting edges at the intersection of the cutting end and side wall.

8. A center cutting end mill according to claim 7 comprising a plurality of veins in the cutting end and a plurality of veins in the side wall, wherein at the intersection of the cutting end and the side wall the ends of the veins in the side wall are out of alignment from the ends of the veins in the cutting end, forming separate cutting edges at the intersection of the cutting end and side wall.

9. A center cutting end mill according to claim 7 wherein the vein in the cutting end extends to the center axis of the end mill.

10. A center cutting end mill according to claim 7 having a plurality of veins in the cutting end wherein the veins do not extend to the center axis of the end mill.

11. A center cutting end mill according to claim 10 wherein the veins in the cutting end of the mill body extend generally radially and are offset from a diameter of the cutting end.

12. A center cutting end mill according to claim 7 wherein the mill is a center cutting ball nose end mill having a generally hemispherical cutting end wherein the vein across the first cutting end of the mill body extends across substantially the entire hemispherical cutting end.

13. A fluted center cutting end mill comprising:

a cemented tungsten carbide mill body having a first cutting end, a second base end, a generally cylindrical side wall having four side grooves in the cylindrical side wall, the mill body further having at least one end groove across a portion of the first cutting end of the mill body;

a vein of polycrystalline-diamond material formed in-situ within the groove in the cutting end of the mill body wherein at the intersection of the cutting end and side wall, the end of the vein in the side wall is approximately 45° out of alignment from the end of a vein in the cutting end;

at least one flute exposing a leading edge of the vein of diamond material in the cutting end of the mill body for forming a continuous cutting edge along the leading edge of the diamond material;

a vein of polycrystalline diamond material formed in-situ within each side groove in the side wall; and flutes in the side wall exposing a leading edge of each of the veins of diamond material in the side wall, forming a continuous cutting edge along the leading edge of the diamond material.

14. A fluted center cutting end mill comprising:

a cemented tungsten carbide mill body having a first cutting end, a second base end, a generally cylindrical side wall having a plurality of side grooves in the cylindrical side wall, the mill body further having an equal number of end grooves, each end groove extending across a portion of the first cutting end of the mill body;

a vein of polycrystalline diamond material formed in-situ within each end groove in the cutting end of the mill body;

flutes exposing a leading edge of each vein of diamond material in the cutting end of the mill body, forming a continuous cutting edge along the leading edge of the diamond material;

a vein of polycrystalline diamond material formed in-situ within each side groove in the side wall; and flutes in the side wall exposing a leading edge of each of the veins of diamond material in the side wall, forming a continuous cutting edge along the leading edge of the diamond material, wherein at the intersection of the cutting end and side walls, the ends of the veins in the side wall are mid way between the ends of the veins in the cutting end.

* * * * *